United States Patent [19]
Sauter et al.

[11] Patent Number: 5,618,473
[45] Date of Patent: Apr. 8, 1997

[54] FRACTIONATION TRAYS

[75] Inventors: John R. Sauter, Stow; Richard P. Hauser, Ravenna; John Harris, Kent, all of Ohio

[73] Assignee: Norton Chemical Process Products Corporation, Worcester, Mass.

[21] Appl. No.: 681,631

[22] Filed: Jul. 29, 1996

Related U.S. Application Data

[63] Continuation-in-part of Ser. No. 401,378, May 9, 1995.

[51] Int. Cl.$^6$ ..................................... B01F 3/04
[52] U.S. Cl. .......................................... 261/114.1
[58] Field of Search ............................. 261/114.1

[56] References Cited

U.S. PATENT DOCUMENTS

| | | | |
|---|---|---|---|
| 2,684,837 | 7/1954 | North et al. | 261/114.1 |
| 2,693,949 | 11/1954 | Huggins | 261/114.1 |
| 2,982,527 | 5/1961 | Eld et al. | 261/114.1 |
| 3,729,179 | 4/1973 | Keller | 261/114.1 |
| 3,797,811 | 3/1974 | Jullien et al. | 261/114.1 |
| 4,275,021 | 6/1981 | Kirkpatrick et al. | 261/114.1 |
| 4,504,426 | 3/1985 | Chuang et al. | 261/114.1 |
| 4,956,127 | 9/1990 | Binkley et al. | 261/114.1 |
| 5,242,628 | 9/1993 | Nye | 261/114.1 |
| 5,277,848 | 1/1994 | Binkley et al. | 261/114.1 |

FOREIGN PATENT DOCUMENTS

| | | | |
|---|---|---|---|
| 0147234 | 8/1985 | Japan | 261/114.1 |
| 1053841 | 11/1983 | U.S.S.R. | 261/114.1 |
| 1432944 | 4/1976 | United Kingdom | 261/114.1 |

*Primary Examiner*—Tim R. Miles
*Attorney, Agent, or Firm*—David Bennett

[57] ABSTRACT

A fractionating column is provided which has perforated fractionating trays and downcomers allowing liquid to flow from one tray to the tray immediately below, said downcomers being provided with radial outflow ports directing downflowing liquids towards the column wall rather than onto the surface of the tray directly below the downcomer. This permits at least a portion of the under-downcomer area to be perforated thereby increasing the capacity of the tray for vapor/liquid contact and ensuring that weeping of the liquid through the perforations is avoided without need for an increase in vapor pressure.

3 Claims, 1 Drawing Sheet

5,618,473

FRACTIONATION TRAYS

This Application is a continuation-in-part of application Ser. No. 08/401,378 filed May 9, 1995.

BACKGROUND OF THE INVENTION

This invention relates to chemical process equipment in which a liquid is contacted with a counterflow of gas. This may be for a variety of purposes such as stripping a component from the liquid stream or absorbing a component into a liquid stream. More generically this invention relates to equipment designed to facilitate mass and/or heat transfer between phases.

The type of equipment to which this invention specifically relates employs cross-flow fractionation trays connected by downcomers. In such equipment a tower is provided with a plurality of fractionation trays arranged generally horizontally within the tower. Each tower has a perforated deck and at least one channel, called a downcomer, in which a liquid flowing over the deck may be collected and channeled to the tray below. In use a gas or vapor is introduced at the base of the tower and passes upwards through the perforations in the decks of the fractionation trays. Meanwhile a liquid is introduced at the top of the tower and percolates downward passing over the fractionation trays and down the downcomers to the tray below. Liquid exits the downcomers in a typical design either through an open bottom and/or the downcomer front area, (that is the side facing towards the center of the tray). In some cases the downcomer may have a bottom pan where liquid flows around and out through slots in the bottom. In some designs there is provision for a perforated area under the downcomer with contact between vapor and liquid precluded by a box over the perforated portion of the under-downcomer area. Normally no provision is made for vapor contact with the liquid in the under-downcomer area and this reduces the capacity of the tower. Some modifications to address this problem have led to the use of slotted bottoms to the downcomers to distribute the liquid flow more evenly so as to allow perforations of the under-downcomer area but this is still a problem area from the point of view of liquid passing directly down through perforations intended for the upward passage of vapor.

According to the ideal process design, the liquid should be prevented from passing through the perforations in the decks of the fractionation trays by the pressure of gas passing through the perforations in the upward direction. This is a finely balanced process since, if the pressure is too great, the gas will have a shorter transit time within the tower and less efficient contact with the down-flowing liquid. The high gas velocity may also cause liquid droplets to be carried up to the tray above, thereby reducing the separation efficiency as a result of back-mixing. On the other hand if the gas flow rate is too low the liquid will penetrate through the perforations in the tray decks, (known as "weeping"), and short-circuit the flow patterns which are intended to maximize liquid/gas contacts.

Thus, in summary, the gas flow should be slow enough to permit efficient contact with the liquid flow but fast enough to minimize weeping. While a pressure differential between the space above a fractionation tray and the space below is necessary, if this differential is too great gas flow will be accelerated as it passes through the perforations and the efficient bubbling contact will be lost. To maintain the same volume of gas flow but reduce the pressure differential it is necessary to maximize the perforated area of the fractionation tray or provide some other efficient mechanism for the gas to contact the liquid as it passes through the fractionation tray.

Weeping is however often a problem when the liquid flow rate is particularly heavy in a local perforated area, and particularly in the under-downcomer area. Therefore to some extent the desire to attain the greatest contact efficiency, (which implies the lowest feasible pressure drop across the tower), by perforating as large a part of the deck surface as possible is at odds with the desire to avoid weeping. The present invention provides a high efficiency, (or high capacity), fractionation tray design that ensures that the danger of weeping is minimized.

GENERAL DESCRIPTION OF THE INVENTION

The present invention provides a fractionating column comprising a first perforated fractionation tray with at least one downcomer for channeling an outflow from the first tray to a second perforated fractionation tray directly below the first in which each downcomer channels downflowing liquid from the first tray to a portion of the second tray adjacent the junction of the tray and the column wall. The downcomer preferably has a restricted exit area designed to ensure that the outflow therefrom is directed exclusively towards a peripheral, non-perforated portion of the second tray. Liquid may, for example, be discharged from the downcomers via radial slots, rectangular slots, castellated weirs or plain weirs specifically designed to direct the flow to a wall/tray junction area from which it can be evenly distributed before contacting the perforated area of the fractionation tray. It is found that if the outflow from the downcomer is spread on the second tray in this manner before it contacts perforations, it is possible to avoid localized heavy flow situations that can lead to weeping. From the wall/tray junction the flow is naturally spread around the wall and enters the perforated area. Because the flow is initially directed towards the wall, a substantial portion of the under-downcomer area can now be perforated either with simple or valved holes, thereby increasing the efficiency of the trays.

In a preferred embodiment, a perforated barrier separates the initial fluid contact area from the perforated portion of the tray such that the flow on to the perforated area is as evenly distributed as possible.

DRAWINGS

DETAILED DESCRIPTION OF THE INVENTION

The invention is now further described with reference to the Drawings which are intended to illustrate the invention but are not to be understood as implying any essential limitations on the scope of the invention.

Figure 1:
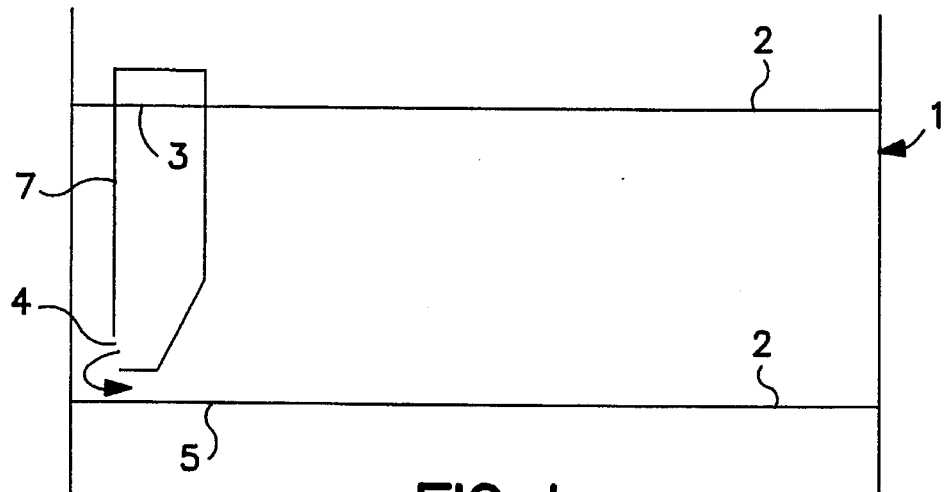
FIG. 1 is cross-section of a portion of a tower containing fractionation trays and a single enclosed downcomer according to the invention.
Figure 2:
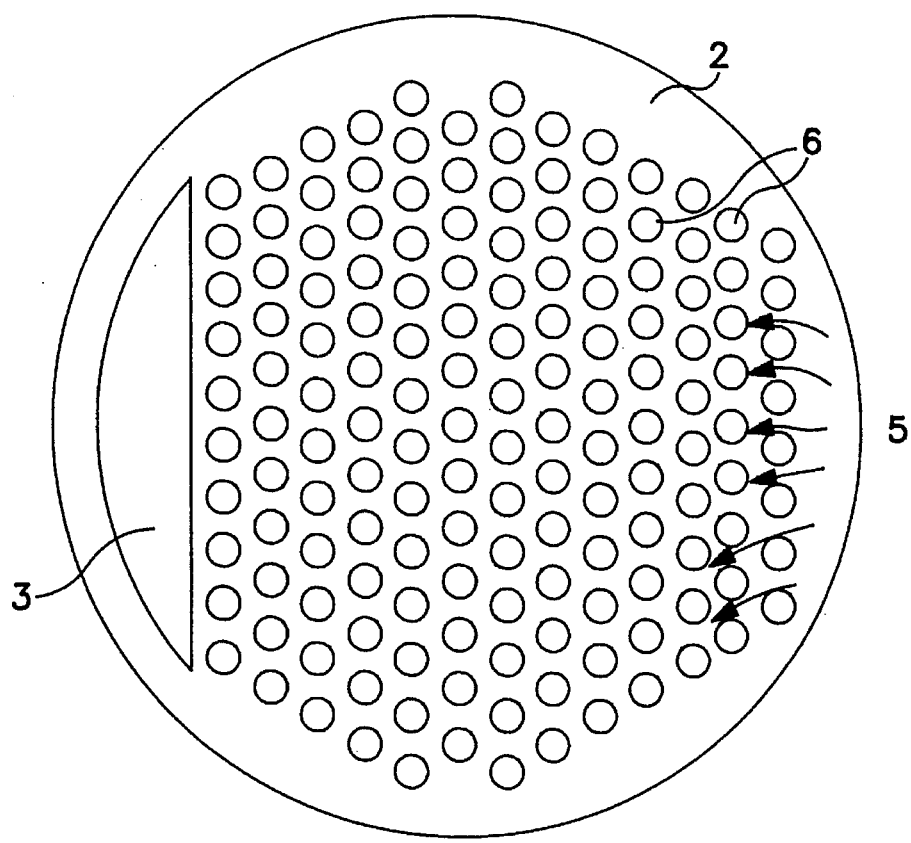
FIG. 2 is a plan view of the lower of the fractionation trays shown in FIG. 1. Perforations are shown in the under-downcomer area.

The device illustrated in FIGS. 1 and 2 comprises a vessel, 1, in which two fractionation trays, 2, are located one above the other in generally horizontal positions. The fractionation trays are provided with a plurality of perforations, 6, and a downcomer, 7, having entry port, 3, and exit port, 4. In FIG. 1 only the downcomer for the upper tray is shown but it is understood that all trays have similar downcomers though the location is usually at the opposed side of the tray to that receiving a flow from the downcomer associated with the tray immediately above. This maximizes the flow path of the liquid and the opportunities for contact with the vapor.

Liquid exiting the downcomer through exit port, 4, is directed to the under-downcomer zone, 5, which is adjacent the wall of the vessel and is unperforated. From there the liquid spreads in the manner shown by the arrows in FIG. 2 such that no part of the tray receives enough liquid to lead to weeping through the perforations in that part.

The above structure is very advantageous since it ensures that liquid flowing out from the downcomers does not channel towards perforations in the fractionation tray deck in such quantities as to prevent vapor flow through the perforations and cause weeping. Rather by ensuring that the flow first contacts non-perforated areas and is spread evenly in the direction of all perforated areas, a uniformly high degree of liquid/vapor contact is maintained.

What is claimed is:

1. A fractionating column having an inner wall and comprising a plurality of horizontally disposed perforated fractionation trays located one above the other within said column including a first perforated fractionation tray with at least one downcomer for channeling an outflow from the first tray through at least one radially disposed exit port to a second perforated fractionation tray directly below the first, said second tray comprising an under-downcomer area located directly below the downcomer from the first fractionation tray, in which the exit port from each downcomer is located in such a way that the outflow therefrom is initially directed towards the inner wall of the column, and at least a portion of the under-downcomer area of the second tray is provided with a plurality of perforations.

2. A fractionating column according to claim 1 in which the under-downcomer area is located in the peripheral area of the tray and at least a portion of the under-downcomer area is provided with perforations to provide for vapor/liquid contact.

3. A fractionating column according to claim 1 which comprises a perforated barrier between the perforated area of the second perforated tray and the area immediately contacted by liquid exiting the downcomer.

* * * * *